(12) United States Patent
Camilleri et al.

(10) Patent No.: US 12,303,978 B2
(45) Date of Patent: May 20, 2025

(54) METHOD OF 3D PRINTING

(71) Applicant: EFFUSIONTECH IP PTY. LTD., Dandenong (AU)

(72) Inventors: Steven Camilleri, Bayview (AU); Sylvain Laversanne, Coburg (AU); Andrew Duguid, Dandenong (AU)

(73) Assignee: Effusiontech IP Pty Ltd, Victoria (AU)

( * ) Notice: Subject to any disclaimer, the term of this patent is extended or adjusted under 35 U.S.C. 154(b) by 767 days.

(21) Appl. No.: 17/292,101

(22) PCT Filed: Oct. 29, 2019

(86) PCT No.: PCT/AU2019/051188
§ 371 (c)(1),
(2) Date: May 7, 2021

(87) PCT Pub. No.: WO2020/093087
PCT Pub. Date: May 14, 2020

(65) Prior Publication Data
US 2021/0394274 A1 Dec. 23, 2021

(30) Foreign Application Priority Data
Nov. 7, 2018 (AU) .................. 2018904238

(51) Int. Cl.
B33Y 10/00 (2015.01)
B22F 10/25 (2021.01)
B22F 12/53 (2021.01)
B33Y 30/00 (2015.01)
(Continued)

(52) U.S. Cl.
CPC .............. *B22F 12/53* (2021.01); *B22F 10/25* (2021.01); *B33Y 10/00* (2014.12); *B33Y 30/00* (2014.12); *C22C 38/44* (2013.01); *C22C 38/46* (2013.01)

(58) Field of Classification Search
CPC ...... B22F 12/53; B22F 10/25; B22F 2999/00; B22F 3/04; B33Y 10/00; B33Y 30/00; C22C 38/44; C22C 38/46; B05B 13/0431; B05B 15/18; B05B 15/50; B05B 7/1486;
(Continued)

(56) References Cited

U.S. PATENT DOCUMENTS

| 7,543,764 B2 | 6/2009 | Haynes et al. |
| 2014/0260478 A1 | 9/2014 | Forbes Jones et al. |
| 2017/0066090 A1* | 3/2017 | Eibl ................. C22C 38/02 |

(Continued)

FOREIGN PATENT DOCUMENTS

CA 3000947 A1 6/2010

OTHER PUBLICATIONS

D2 tool steel Data sheet, Markforged Oct. 23, 2023 (Year: 2023).*
(Continued)

*Primary Examiner* — Rebecca Janssen
(74) *Attorney, Agent, or Firm* — WELSH FLAXMAN & GITLER LLC

(57) ABSTRACT

A method of 3D printing an item, wherein a spray material comprising a powder entrained in an oxygen comprising carrier gas is emitted from a spray nozzle 8. The nozzle 8 comprises a constricted throat 11 that has a thermal conductivity of at least 10 W/mk and a hardness of at least 10 Rockwell C (HRC). The temperature of the throat does not exceed 250° C., and preferably does not exceed 200° C.

15 Claims, 2 Drawing Sheets

(51) Int. Cl.
*C22C 38/44* (2006.01)
*C22C 38/46* (2006.01)

(58) Field of Classification Search
CPC ....... B05B 7/1606; Y02P 10/25; C23C 24/08; C23C 24/04
See application file for complete search history.

(56) References Cited

U.S. PATENT DOCUMENTS

| | | |
|---|---|---|
| 2017/0136545 A1 | 5/2017 | Yoshimura et al. |
| 2017/0232674 A1* | 8/2017 | Mark .................... B29C 31/042 264/308 |
| 2017/0355138 A1* | 12/2017 | Mark ...................... B29C 64/20 |
| 2018/0056395 A1* | 3/2018 | Hofacker ................ B22F 3/115 |
| 2018/0281237 A1 | 10/2018 | Frechman et al. |
| 2019/0161865 A1* | 5/2019 | Chipko .................. B33Y 10/00 |

OTHER PUBLICATIONS

Mohammadnezhad et al. Effects of vanadium addition on microstructure, mechanical properties and wear resistance of Ni-Hard4 white cast iron, Materials and Design 49 (2013) 888-893 (Year: 2013).*

* cited by examiner

METHOD OF 3D PRINTING

RELATED APPLICATIONS

This application is a national stage filing under 35 U.S.C. 371 of International Application No.: PCT/AU2019/051188, filed Oct. 29, 2019, which claims priority to AU 2018904238, filed Nov. 7, 2018, the entire teachings of which are incorporated herein by reference.

FIELD OF INVENTION

This invention relates to a method of producing items by way of 3D printing, tailored to avoid or reduce degradation of a spray nozzle used as part of the method.

BACKGROUND

Typically, a 3D printer creates an item by adding print material to a substrate in increments. Such printers may have a motion control system that is able to direct where the material is placed. The control system may be attached to either the print head (e.g. the part that dispenses spray material) or the substrate (e.g. which holds the partly-formed item as it builds), or both.

The print head incorporates a nozzle for emitting the print material in the form of a powder entrained in a stream of gas. A problem with at least some 3D printers is that their nozzle is prone to degradation, for example clogging or erosion.

U.S. Pat. No. 7,543,764 B2 refers to a cold spray system in which nitrogen and/or helium gas is used as a carrier for spray powder. The system incorporates a spray nozzle having a throat region formed from polybenzoimizidole (PBI) polymer. This material is not very adhesive to spray material passing over it (i.e. it is not so prone to clogging). However PBI polymer is not particularly hard wearing; it is quite prone to erosion over time.

US patent specification No. 2013-0087633 refers to a cold spray system where the spray nozzle is formed from biphenyl tetracarboxylic dianhydride (BPDA), low expansion glass or silicon nitride. BPDA is a polymer with similar properties to PBI and is therefore prone to erosion. Glass and silicon nitride nozzles may wear well, but can be difficult to economically produce to a high level of precision. They often have an electrical conductivity too low for easy electro-discharge machining, and can be undesirably prone to clogging.

OBJECT OF THE INVENTION

It is an object of a preferred embodiment of the invention to go at least some way towards addressing one or more of the above problems. It should however be understood that the object of the invention per se is simply to provide a useful choice. Therefore, any objects or advantages applicable to any preferred embodiments should not be seen as a limitation of the scope of claims expressed more broadly.

SUMMARY OF INVENTION

According to one aspect of the invention there is provided a method of 3D printing an item, wherein:
a) a spray material comprising a powder entrained in an oxygen comprising carrier gas is emitted from a spray nozzle;
b) the nozzle comprises a constricted throat that has:
   i) a thermal conductivity greater than 10 W/mk; and
   ii) a hardness greater than 10 Rockwell C (HRC); and
c) the temperature of the throat portion does not exceed 250° C., and preferably it does not exceed 200° C.

Optionally the hardness is greater than 20 Rockwell C (HRC).

Optionally the throat has an electrical conductivity greater than 1 S/m.

Optionally the carrier gas comprises at least 1% oxygen.

Optionally the carrier gas comprises compressed air.

Optionally the throat comprises between 5% and 30% by volume of:
a) chromium carbide;
b) iron carbide;
c) vanadium carbide; or
d) any combination of the these.

Optionally the throat comprises iron-nickel alloy.

Optionally the throat comprises Ni-hard.

Optionally the throat comprises one or more of:
a) Cold Work Steel(s);
b) Plastic Mould Steel(s);
c) High Speed Steel(s); and
d) White Cast Iron(s).

Optionally the Cold Work Steel comprises one or more of:
i) D2 or a commercial equivalent;
ii) A2, A6 or a commercial equivalent;
iii) P20 or a commercial equivalent;
iv) O1, O2 or a commercial equivalent;
v) S2, S6 or S7, or a commercial equivalent; and
vi) M2, M42 or a commercial equivalent.[1]

[1] See for example https://www.azom.com/article.aspx?ArticleID=6138; and http://www.westyorkssteel.com/steel-specifications/international-standards/tool-steel/; and https://en.wikipedia.org/wiki/Aluminium_alloy.

Optionally the Cold Work Powder Steel comprises Bohler K390.

Optionally the Plastic Mould Steel comprises P20.

Optionally the High Speed Steel Comprises M2 or M42.

Optionally the White Cast Iron comprises EN-JN2049.

Optionally the Steel comprises at least 1% carbon and at least 5% chromium.

Optionally the Steel comprises at least 2% carbon and at least 6% vanadium.

Optionally the Steel comprises at least 0.35% carbon, at least 2% chromium and at least 1% nickel.

Optionally the Steel comprises at least 0.8% carbon, at least 3.5% chromium, at least 4% molybdenum and at least 1% vanadium.

Optionally the White Cast Iron comprises EN-JN2049.

Optionally there is a cooling system employed to control the temperature of the throat.

Optionally D2, A2 and A6 are cold work steels, optionally P20 is a plastic mould steel, optionally O1 or O2 are an oil hardening steel, optionally S2, S6 and S7 are shock resistant steels, optionally M2 and 42 are molybdenum high speed steels.

DRAWINGS

Some preferred embodiments of the invention will now be described by way of example and with reference to the accompanying drawings of which:

DETAILED DESCRIPTION

Figure 1:
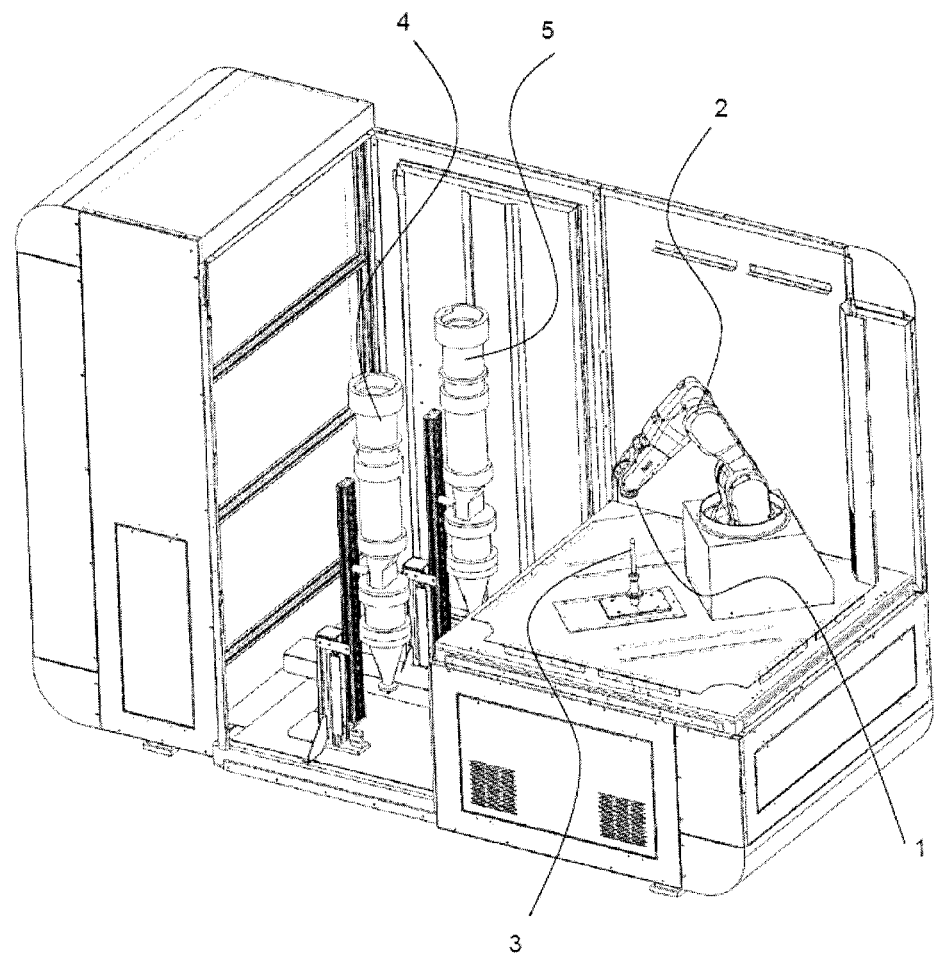
FIG. 1 is an isometric view of a 3D printer.

Referring to FIG. 1, a 3D printer has a grip 1 which incorporates a robotic arm 2 by which at least part of the grip can move. The printer also has a cold spray head 3. The grip 1 holds a substrate and exposes it to print material sprayed from the spray head 3 to build a 3D item on the substrate.

The printer has two feeders 4, 5 for feeding one or more types of print material (e.g. powder) to the spray head 3. This enables a 3D item to be built up from a blend of different print materials, or for different parts of the item to be formed from different print materials. In other embodiments of the printer there may only be one of the feeders 4, 5, and in still others there may be more than two of the feeders.

The printer incorporates an internal computerised controller (not depicted) that regulates movement of the robotic arm 2 and/or the spray head 3 so that the print material is always at the correct angle of attack for forming the 3D item. The controller also controls the temperature of the print material and the speed at which it leaves the spray head 3. The controller is guided by information in CAD files to give the 3D item the desired geometry and composition. The same or a separate controller means can be used to control the temperature of the throat.

Figure 2:
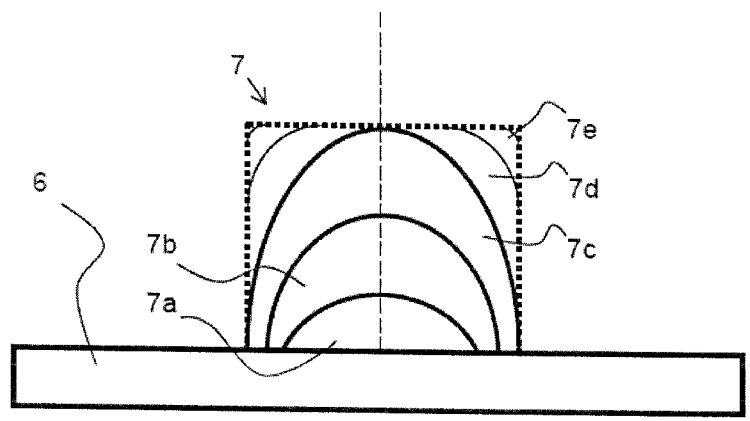
FIG. 2 is a schematic side view of an item which has been 3D printed by the printer.

Referring to FIG. 2, the substrate 6 supports the 3D item 7 when built up from incremental layers 7a-e of print material. The robotic arm 2 adjusts the position and orientation of the substrate 6 as the item builds so that the print material is applied at the correct angle and to the right part of the substrate, or to the partially formed item, as the item builds.

The print material preferably leaves the print head as a spray. Examples of the sort of material that can be used for this are powdered alloys of non-ferrous metals such as aluminium 7075 or manganese bronze or powdered steels such as 316 stainless steel. A particularly preferred material is Valimet 6061 applied as a cold spray at a temperature of 500° C. and a velocity of 700 m/s. In other embodiments of the invention the print material may be applied as a molten plastic filament, such as used in Fused Deposition Melding (FDM). In such cases the print material may be ABS polymer.

Figure 3:
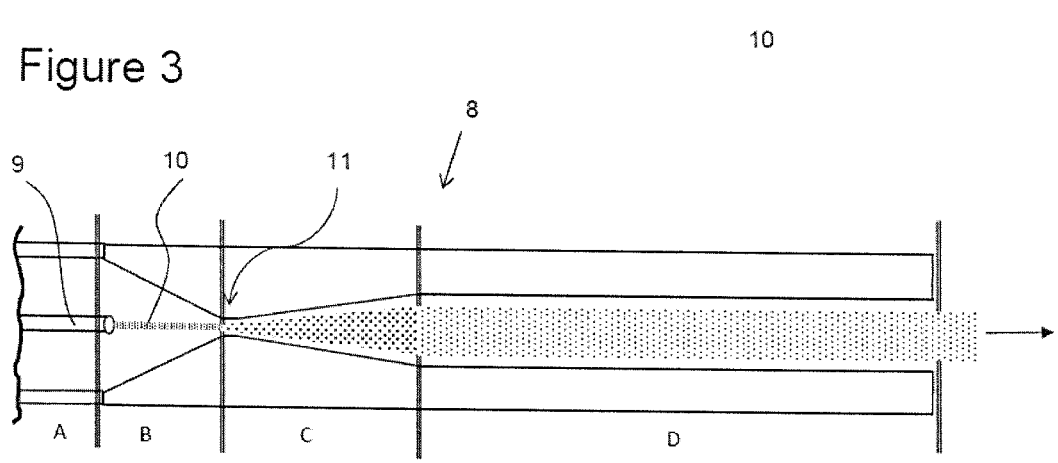
FIG. 3 is a schematic side view of a spray nozzle forming part of the printer.

FIG. 3 illustrates a cold spray nozzle 8 forming part of the print head 3. The nozzle 8 may be notionally divided into four zones; A, B, C and D. Zone A is a 'stagnation region' that has an injector 9 for emitting print material in the form of a powder 10 into a train of high temperature high pressure carrier gas. The powder and gas together provide a 'spray material'. Zone B is a "converging region" where the nozzle walls taper down to provide a supersonic throat 11. Zone C is a "throat and diverging region" where the nozzle walls gradually diverge. Zone D is a "straight barrel" region where the nozzle diameter is more or less constant. In some embodiments the barrel region may be omitted in favour of an elongated Zone C.

Preferably the 3D printer is such that
a) the throat has a thermal conductivity greater than 10 W/mk;
b) the throat has a hardness greater than 10 (and optionally greater than 20) Rockwell C (HRC);
c) the throat has an electrical conductivity of at least 1 S/m;
d) the throat comprises about 5%, preferably about 10% and more preferably about 20% by volume of:
  i) chromium carbide;
  ii) iron carbide;
  iii) vanadium carbide; or
  iv) any combination of the these;
e) the temperature of the throat is from 50° C. to 250° C.; and
f) the carrier gas has 0.5 to 24% oxygen by volume.

More preferably the 3D printer is such that—
a) the throat has a thermal conductivity of from 10 W/mk;
b) the throat has a hardness greater than 20 Rockwell C (HRC);
c) the throat has an electrical conductivity of at least 5,000 S/m;
d) the throat is formed from Ni-Hard (cast iron, alloyed with nickel and chromium);
e) the temperature of the throat is 100 to 200° C.; and
f) the carrier gas is compressed air.

Optional materials for forming the throat 11 are any one or any combination of—
a) Cold work steels, for example—
  i) D2 and its commercial equivalents;
  ii) A2 and its commercial equivalents;
  iii) O2 and its commercial equivalents;
  iv) S2 and its commercial equivalents; or
  v) Cold work powder steels such as Bohler K390;
b) Plastic mould steels, for example P20;
c) High Speed Steels, for example M2 or M42; and
d) White Cast irons, for example EN-JN2049.

Preferably at least the throat 11 is formed by electro-discharge machining.

It has been found that the above materials work particularly well when the print material comprises oxygen or an oxygen containing gas. While the reason for this has yet to be confirmed, it is believed that when the throat has oxide forming surfaces the gas allows for the continuous regeneration of an ablating "skin" at the throat. It is further hypothesised that the skin resists bonding/clogging by passing powder particles and, in the event that such bonding occurs, it provides a shear layer that allows powder particles to easily detach from the throat upon contact with further passing powder particles.

In terms of disclosure, this document hereby envisages and discloses each item, step or other feature mentioned herein in combination with one or more of any of the other items, steps or other features disclosed herein, in each case regardless of whether such combination is claimed.

While some preferred forms of the invention have been described by way of example, it should be understood that modifications and improvements can occur without departing from the following claims.

The invention claimed is:

1. A method of 3D printing an item, comprising the step of:
spraying from a spray nozzle, a spray material comprising a powder entrained in an oxygen comprising carrier gas, wherein the spray nozzle comprises a constricted throat that has:
  i. a thermal conductivity of at least 10 W/mk;
  ii. a hardness of at least 10 Rockwell C (HRC), wherein the constricted throat comprises between 5% and 30% by volume of:
    chromium carbide;
    iron carbide;
    vanadium carbide; or
    any combination of chromium carbide, iron carbide and vanadium carbide; and
  iii. a temperature of the constricted throat does not exceed 250° C.

2. A method according to claim 1, wherein the hardness is at least 20 Rockwell C (HRC).

3. A method according to claim 1, wherein the temperature of the constricted throat does not exceed 200° C.

4. A method according to claim 1, wherein the constricted throat has an electrical conductivity greater than 1 S/m.

5. A method according to claim 1, wherein the carrier gas comprises at least 1% by volume of oxygen.

6. A method according to claim 1, wherein the carrier gas comprises compressed air.

7. A method according to claim 1, wherein the constricted throat comprises iron-nickel alloy.

8. A method according to claim 1, wherein the constricted throat comprises Ni-hard.

9. A method according to claim 1, wherein the constricted throat comprises one or more of:
   a) Cold Work steel(s);
   b) Plastic mould steel(s);
   c) Oil Hardening steel;
   d) Shock Resistant steel;
   e) High Speed steel(s); and
   f) white Cast iron(s).

10. A method according to claim 9, wherein the Cold Work steel(s) comprise(s) cold work powder steel(s).

11. A method according to claim 9, wherein:
   a) the Cold Work steel comprises a composition with greater than 1% by mass of carbon and greater than 5% by mass of chromium; or
   b) the Cold Work steel comprises a composition with greater than 2% by mass of carbon and greater than 6% by mass of vanadium; or
   c) the Plastic Mould Steel comprises a composition with at least 0.35% by mass of carbon, at least 2% by mass of chromium and at least 1% by mass of nickel; or
   d) the High Speed Steel comprises a composition greater than 0.8% by mass of carbon, greater than 3.5% by mass of chromium, greater than 4% by mass of molybdenum, and greater than 1% by mass of vanadium; or
   e) the White Cast Iron comprises EN-JN2049.

12. A method according to claim 1, comprising a cooling system employed to control the temperature of the constricted throat.

13. A method according to claim 1, wherein:
   a) the hardness is at least 20 Rockwell C (HRC);
   b) the temperature of the constricted throat does not exceed 200° C.;
   c) the throat has an electrical conductivity greater than 1 S/m; and
   d) the carrier gas comprises at least 1% by volume of oxygen.

14. A method according to claim 13, wherein the constricted throat comprises iron-nickel alloy.

15. A method according to claim 13, wherein the constricted throat comprises one or more of:
   a) Cold Work steel(s);
   b) Plastic mould steel(s);
   c) Oil Hardening steel;
   d) Shock Resistant steel;
   e) High Speed steel(s); and
   f) White Cast iron(s).

* * * * *